US012564936B2

(12) United States Patent
Yang

(10) Patent No.: US 12,564,936 B2
(45) Date of Patent: Mar. 3, 2026

(54) TELESCOPIC HANGER ASSEMBLY

(71) Applicant: ZHEJIANG PRULDE ELECTRIC APPLIANCE CO., LTD., Jinhua (CN)

(72) Inventor: Weiming Yang, Jinhua (CN)

(73) Assignee: ZHEJIANG PRULDE ELECTRIC APPLIANCE CO., LTD., Jinhua (CN)

( * ) Notice: Subject to any disclaimer, the term of this patent is extended or adjusted under 35 U.S.C. 154(b) by 253 days.

(21) Appl. No.: 18/681,098

(22) PCT Filed: Jun. 17, 2021

(86) PCT No.: PCT/CN2021/100531
§ 371 (c)(1),
(2) Date: Feb. 5, 2024

(87) PCT Pub. No.: WO2022/241886
PCT Pub. Date: Nov. 24, 2022

(65) Prior Publication Data

US 2024/0208039 A1 Jun. 27, 2024

(30) Foreign Application Priority Data

May 21, 2021 (CN) ........................ 202121108304.1

(51) Int. Cl.
*B25H 3/00* (2006.01)
*B25F 5/02* (2006.01)

(52) U.S. Cl.
CPC ............... *B25H 3/006* (2013.01); *B25F 5/02* (2013.01)

(58) Field of Classification Search
CPC ... B25H 3/00; B25H 3/006; B25F 5/02; A45F 5/00; A45F 5/1575; Y10T 70/459
(Continued)

(56) References Cited

U.S. PATENT DOCUMENTS 1,849,070 A * 3/1932 Buehner ................. E05B 67/24 70/38 C
3,423,969 A * 1/1969 Foote ...................... E05B 67/24 70/38 A (Continued)

FOREIGN PATENT DOCUMENTS

CN 101186033 A 5/2008
CN 102303308 A 1/2012

(Continued)

OTHER PUBLICATIONS 2013-2017 Forecast of production and sales demand in China's power tool industry Transformation and Upgrading Analysis Report, Forward, pp. 1-9.

*Primary Examiner* — Jonathan Liu
*Assistant Examiner* — Guang H Guan
(74) *Attorney, Agent, or Firm* — Bayramoglu Law Offices LLC

(57) ABSTRACT

A telescopic hanger assembly includes a housing connected to a handheld electric tool and further includes a hanging component. The hanging component has a first connecting portion and a second connecting portion, the first connecting portion extends into the housing, a vertically arranged mounting groove is arranged in the housing, and the first connecting portion extends into the mounting groove; a first spring for pushing up the first connecting portion is mounted in the mounting groove; a snap-in groove is arranged at a lower end of the second connecting portion, and the second connecting portion enters or leaves the housing as the first connecting portion expands and contracts; the housing is provided therein with an automatic buckling mechanism that buckles and locks the second connecting portion extending into the housing. Through its telescopic structure, the tele-
(Continued)

scopic hanger assembly facilitates the storage of the electric tools.

7 Claims, 2 Drawing Sheets

(58) Field of Classification Search
USPC ................ 248/690, 691, 692; 224/268, 269; 70/38 A
See application file for complete search history.

(56) References Cited

U.S. PATENT DOCUMENTS

| | | | | |
|---|---|---|---|---|
| 4,473,176 | A * | 9/1984 | Harper | B27B 17/00 206/349 |
| 4,787,145 | A * | 11/1988 | Klicker | B27B 9/00 30/388 |
| 4,811,578 | A * | 3/1989 | Masoncup | E05B 45/005 70/53 |
| 5,850,698 | A * | 12/1998 | Hurn | B27B 9/00 30/377 |
| 7,111,364 | B2 * | 9/2006 | Bader | B25F 5/02 224/268 |
| 7,306,052 | B2 * | 12/2007 | Vahabi-Nejad | B25C 7/00 173/217 |
| 7,661,278 | B1 * | 2/2010 | Yang | E05B 39/04 70/432 |
| 8,167,056 | B2 * | 5/2012 | Ito | B25H 3/006 173/171 |
| 8,308,034 | B2 | 11/2012 | Shibata et al. | |
| 8,534,375 | B2 | 9/2013 | Matsumoto et al. | |
| 8,752,744 | B2 | 6/2014 | Okouchi et al. | |
| 9,457,461 | B2 * | 10/2016 | Francis | B23Q 13/00 |
| 10,040,178 | B2 * | 8/2018 | Kondo | B25F 5/00 |
| 10,286,539 | B2 * | 5/2019 | Francis | A61K 47/58 |
| 11,305,413 | B2 * | 4/2022 | Zhou | F16M 13/022 |
| 11,559,879 | B2 * | 1/2023 | Machida | B25F 5/02 |
| 11,565,396 | B2 * | 1/2023 | Yoshikane | B25F 5/02 |
| 11,684,985 | B2 * | 6/2023 | Nakashima | B23D 45/16 30/388 |
| 11,772,254 | B2 * | 10/2023 | Machida | B25F 5/006 173/171 |
| 11,964,356 | B2 * | 4/2024 | Otani | B24B 23/02 |
| 12,384,014 | B2 * | 8/2025 | Gong | B25F 5/00 |
| 12,467,491 | B2 * | 11/2025 | Braun | F16B 2/16 |
| 2007/0138233 | A1 | 6/2007 | Yang | |
| 2007/0277990 | A1 | 12/2007 | Steinbrunner et al. | |
| 2014/0097217 | A1 | 4/2014 | Walsh | |
| 2021/0053175 | A1 | 2/2021 | Otani et al. | |
| 2024/0208039 | A1 * | 6/2024 | Yang | B25F 5/02 |

FOREIGN PATENT DOCUMENTS

| | | | | |
|---|---|---|---|---|
| CN | 204403275 | U | | 6/2015 |
| CN | 109953693 | A | | 7/2019 |
| CN | 212042945 | U | | 12/2020 |
| DE | 102004032788 | A1 | | 2/2006 |
| JP | 2006181709 | A | * | 7/2006 |

* cited by examiner

TELESCOPIC HANGER ASSEMBLY

CROSS REFERENCE TO THE RELATED APPLICATIONS

This application is the national phase entry of International Application No. PCT/CN2021/100531, filed on Jun. 17, 2021, which is based upon and claims priority to Chinese Patent Application No. 202121108304.1, filed on May 21, 2021, the entire contents of which are incorporated herein by reference.

TECHNICAL FIELD

The invention relates to the technical field of handheld electric tool accessories, and in particular to a telescopic hanger assembly for storing and hanging handheld electric tools conveniently.

BACKGROUND

Based on the statistics of the Report of Production & Sales Demand Forecast and Transformation & Upgrading Analysis on China Electric Tools Industry, electric tools are mainly classified into electric metal cutting tools, electric grinding tools, electric assembly tools and electric tools for railways.

With the rapid development of battery materials, the demand for portable handheld electric tools is increasing. In daily use, electric tools need to be stored after use. A common storage method is to hang the electric tools up. However, due to the structural limitations of the electric tools, they may not match hooks that have been set up, which does not facilitates the storage of electric tools.

SUMMARY

An objective of the invention is to provide a telescopic hanger assembly. Through its telescopic structure, the invention facilitates the storage of the electric tools using the invention.

In order to solve this technical problem, the technical solution of the invention is implemented as follows: a telescopic hanger assembly, including a housing connected to a handheld electric tool and further including a hanging component, wherein the hanging component has a first connecting portion and a second connecting portion, the first connecting portion extends into the housing, a vertically arranged mounting groove is arranged in the housing, and the first connecting portion extends into the mounting groove; a first spring for pushing up the first connecting portion is mounted in the mounting groove;

- a snap-in groove is arranged at a lower end of the second connecting portion, and the second connecting portion enters or leaves the housing as the first connecting portion expands and contracts;
- the housing is provided therein with an automatic buckling mechanism that buckles and locks the second connecting portion extending into the housing.

As a further improvement, a continuous contact portion is arranged between the first connecting portion and the second connecting portion of the hanging component. The hanging component is hung on an external hook by means of the continuous contact portion, and the continuous contact portion may be structured in many ways, such as U-shaped, semicircular, or with a through hole in the middle.

As a further improvement, the continuous contact portion is inclined in a direction away from the housing. The invention reduces the interference of the volume of the electric tool and the hanging space structure by providing the continuous contact portion inclined in a direction away from the housing, thereby facilitating the use of the invention.

As a further improvement, the automatic buckling mechanism sequentially includes, along the housing in a horizontal direction from the outside to the inside, a push block protruding from the housing and movable horizontally relative to the housing, a linkage component, a buckling component and a second spring, wherein two ends of the linkage component are respectively connected to the push block and the buckling component, and the buckling component is mounted inside the housing by means of the horizontally arranged second spring. According to the invention, the push block of the automatic buckling mechanism moves toward the housing after being pressed by a finger, the push block drives the linkage component and the buckling component to move in the housing, the second spring is compressed, a buckling protrusion of the buckling component is separated from the second connecting portion, and the first connecting portion is always subject to an upward elastic force of the first spring, so under the action of the first spring, the hanging component moves upward and the second connecting portion extends out of the housing. When a downward force is applied to the hanging component, the second connecting portion enters the housing. Since the buckling protrusion of the buckling component is connected to the second spring, when the second connecting portion extends into the housing from above, the buckling component is squeezed by the second connecting portion and adaptively moves backward to the snap-in groove and aligns with the buckling protrusion. Under the action of a restoring force of the second spring, the buckling protrusion of the buckling component moves into the snap-in groove, and then the hanging component is buckled and locked.

As a further improvement, the housing has a receiving cavity for receiving the automatic buckling mechanism. By providing the receiving cavity, the invention facilitates the installation and arrangement of the automatic buckling mechanism, and it also facilitates component maintenance.

As a further improvement, a lower end of the first connecting portion is provided with a connecting protrusion, and the first spring is mounted on the first connecting portion by means of the connecting protrusion. The invention ensures that the first connecting portion moves up and down in the mounting groove stably and reliably.

As a further improvement, the mounting groove is covered by a positioning component, and the first connecting portion passes through the positioning component. The positioning component works together with the connecting protrusion to further limit the movement of the first connecting portion in the mounting groove, thereby limiting the expansion and contraction range of the invention.

As a further improvement, when the second connecting portion is outside the housing, the hanging component can rotate relative to the housing.

The hanging component of the invention can rotate relative to the housing, that is, the opening direction of the hanging component can be changed, which is convenient for storage in various environments.

By adopting the above technical solutions, the beneficial effects of the invention are as follows:

The invention includes the housing connected to the handheld electric tool. The first spring pushes up the hanging component by means of the first connecting portion of the hanging component, the second connecting portion extends out of the housing, and at this time, the hanging component is in an extended state. When a downward force is applied to the hanging component, the second connecting portion enters the housing and its snap-in groove is buckled by the automatic buckling mechanism, and at this time, the hanging component is in a contracted state. The invention is arranged on the handheld electric tool, and its hanging component can be contracted and expanded relative to the housing and the handheld electric tool in the manner described above to match hooks of different specifications to store the electric tool. It is easy to use and is conducive to the storage of the electric tool.

In this way, the above-mentioned objective of the invention is thus achieved.

Figure 1:
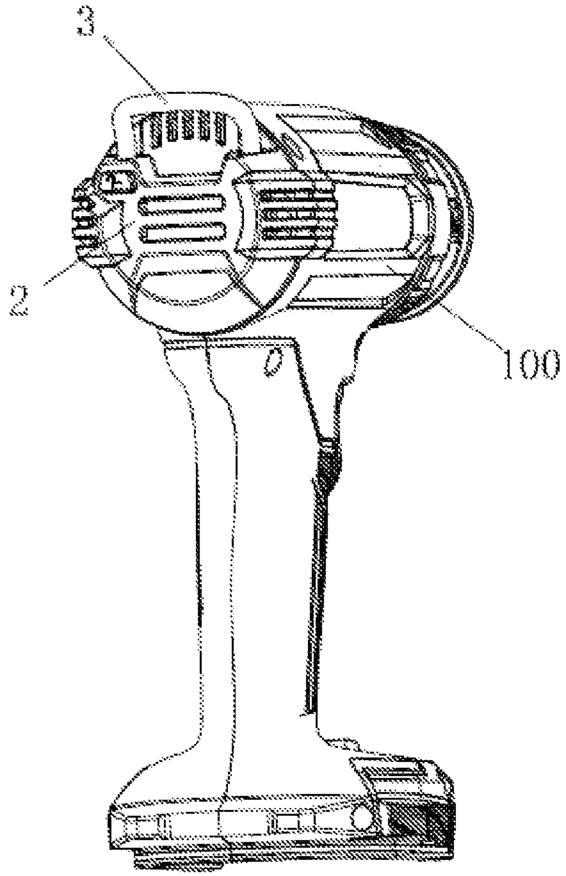
FIG. 1 is a perspective view of a telescopic hanger assembly according to the invention applied to a handheld electric tool.

In the figures, electric tool 100; housing 2; mounting groove 21; receiving cavity 22; hanging component 3; first connecting portion 31; connecting protrusion 311; second connecting portion 32; snap-in groove 321; continuous contact portion 33; first spring 4; automatic buckling mechanism 5; push block 51; linkage component 52; buckling component 53; buckling protrusion 531; second spring 54; positioning component 6.

DETAILED DESCRIPTION OF THE EMBODIMENTS

In order to further explain the technical solution of the invention, the invention will be described in detail through specific embodiments below.

Figure 3:
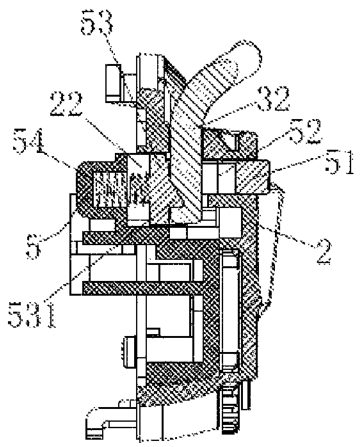
FIG. 3 is a cross-sectional view of the invention from a buckling side.
Figure 4:
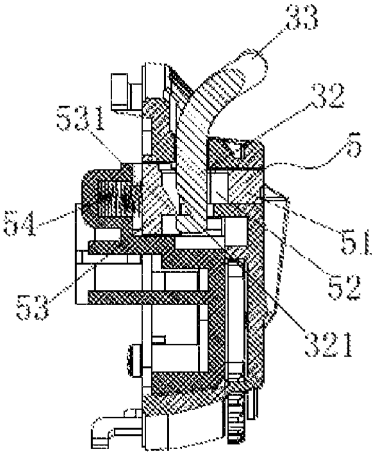
FIG. 4 is a cross-sectional view of the invention in a contact and buckled state.

The invention discloses a telescopic hanger assembly, as shown in FIG. 1, includes a housing 2 connected to a handheld electric tool 100 and further includes a hanging component 3. The hanging component 3 has a first connecting portion 31 and a second connecting portion 32, the first connecting portion 31 extends into the housing 2, a vertically arranged mounting groove 21 is arranged in the housing 2, and the first connecting portion 31 extends into the mounting groove 21; a first spring 4 for pushing up the first connecting portion 31 is mounted in the mounting groove 21. As shown in FIGS. 3 and 4, a snap-in groove 321 is arranged at a lower end of the second connecting portion 32, and the second connecting portion 32 enters or leaves the housing 2 as the first connecting portion 31 expands and contracts; the housing 2 is provided therein with an automatic buckling mechanism 5 that buckles and locks the second connecting portion 32 extending into the housing 2.

The invention includes the housing 2 connected to the handheld electric tool 100. The first spring 4 pushes up the hanging component 3 by means of the first connecting portion 31 of the hanging component, the second connecting portion 32 extends out of the housing 2, and at this time, the hanging component 3 is in an extended state. When a downward force is applied to the hanging component 3, the second connecting portion 32 enters the housing 2 and its snap-in groove 321 is buckled by the automatic buckling mechanism 5, and at this time, the hanging component 3 is in a contracted state. The invention is arranged on the handheld electric tool 100, and its hanging component 3 can be contracted and expanded relative to the housing 2 and the handheld electric tool 100 in the manner described above to match hooks of different specifications to store the electric tool 100. It is easy to use and is conducive to the storage of the electric tool 100.

In this embodiment, a continuous contact portion 33 is arranged between the first connecting portion 31 and the second connecting portion 32 of the hanging component 3. The hanging component 3 is hung on an external hook by means of the continuous contact portion 33, and the continuous contact portion 33 may be structured in many ways, such as U-shaped, semicircular, or with a through hole in the middle.

In this embodiment, the continuous contact portion 33 is inclined in a direction away from the housing 2. The invention reduces the interference of the volume of the electric tool 100 and the hanging space structure by providing the continuous contact portion 33 inclined in a direction away from the housing 2, thereby facilitating the use of the invention.

According to the invention, as shown in FIG. 3, the automatic buckling mechanism 5 sequentially includes, along the housing 2 in a horizontal direction from the outside to the inside, a push block 51 protruding from the housing 2 and movable horizontally relative to the housing 2, a linkage component 52, a buckling component 53 and a second spring 54, wherein two ends of the linkage component 52 are respectively connected to the push block 51 and the buckling component 53, and the buckling component 53 is mounted inside the housing 2 by means of the horizontally arranged second spring 54. According to the invention, the push block 51 of the automatic buckling mechanism 5 moves toward the housing 2 after being pressed by a finger, the push block 51 drives the linkage component 52 and the buckling component 53 to move in the housing 2, the second spring 54 is compressed, a buckling protrusion of the buckling component 53 is separated from the second connecting portion 32, and the first connecting portion 31 is always subject to an upward elastic force of the first spring 4, so under the action of the first spring 4, the hanging component 3 moves upward and the second connecting portion 32 extends out of the housing 2. When a downward force is applied to the hanging component 3, the second connecting portion 32 enters the housing 2. Since the buckling protrusion 531 of the buckling component 53 is connected to the second spring 54, when the second connecting portion 32 extends into the housing 2 from above, the buckling component 53 is squeezed by the second connecting portion 32 and adaptively moves backward to the snap-in groove 321 and aligns with the buckling protrusion 531. Under the action of a restoring force of the second spring 54, the buckling protrusion 531 of the buckling component 53 moves into the snap-in groove 321, and then the hanging component 3 is buckled and locked.

In this embodiment, the housing 2 has a receiving cavity 22 for receiving the automatic buckling mechanism 5. By providing the receiving cavity 22, the invention facilitates the installation and arrangement of the automatic buckling mechanism 5, and it also facilitates component maintenance.

Figure 2:
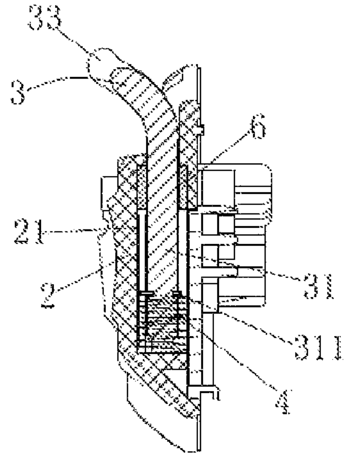
FIG. 2 is a cross-sectional view of the invention from a telescopic side.

In this embodiment, as shown in FIG. 2, a lower end of the first connecting portion 31 is provided with a connecting protrusion 311, and the first spring 4 is mounted on the first connecting portion 31 by means of the connecting protrusion 311. The invention ensures that the first connecting portion 31 moves up and down in the mounting groove 21 stably and reliably. In this embodiment, the mounting groove 21 is covered by a positioning component 6, and the first connecting portion 31 passes through the positioning component 6. The positioning component 6 works together with the connecting protrusion 311 to further limit the movement of the first connecting portion 31 in the mounting groove 21, thereby limiting the expansion and contraction range of the invention.

Figure 5:
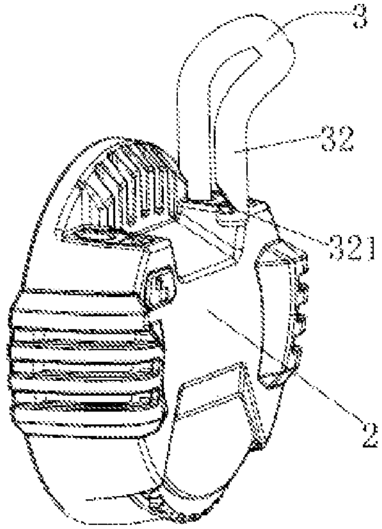
FIG. 5 is a perspective view of the invention in an extended state.

In this embodiment, as shown in FIG. 5, when the second connecting portion 32 is outside the housing 2, the hanging component 3 can rotate relative to the housing 2. The hanging component 3 of the invention can rotate relative to the housing 2, that is, the opening direction of the hanging component 3 can be changed, which is convenient for storage in various environments.

The above-mentioned embodiments and drawings do not limit the product form and style of the invention. Any appropriate changes or modifications made by those of ordinary skill in the art shall be regarded as not departing from the patent scope of the invention.

What is claimed is:

1. A telescopic hanger assembly, comprising a housing connected to a handheld electric tool and further comprising a hanging component, wherein the hanging component has a first connecting portion and a second connecting portion, the first connecting portion extends into the housing, a vertically arranged mounting groove is arranged in the housing, and the first connecting portion extends into the vertically arranged mounting groove;

a first spring for pushing up the first connecting portion is mounted in the vertically arranged mounting groove;

a snap-in groove is arranged at a lower end of the second connecting portion, and the second connecting portion enters or leaves the housing as the first connecting portion expands and contracts; and an automatic buckling mechanism is provided in the housing and buckles and locks the second connecting portion extending into the housing;

wherein the automatic buckling mechanism sequentially comprises, along the housing in a horizontal direction from an outside of the housing to an inside of the housing, a push block protruding from the housing and movable horizontally relative to the housing, a linkage component, a buckling component and a horizontally arranged second spring, wherein two ends of the linkage component are respectively connected to the push block and the buckling component, and the buckling component is mounted inside the housing by the horizontally arranged second spring.

2. The telescopic hanger assembly according to claim 1, wherein a continuous contact portion is arranged between the first connecting portion and the second connecting portion.

3. The telescopic hanger assembly according to claim 2, wherein the continuous contact portion is inclined in a direction away from the housing.

4. The telescopic hanger assembly according to claim 1, wherein the housing has a receiving cavity for receiving the automatic buckling mechanism.

5. The telescopic hanger assembly according to claim 1, wherein a lower end of the first connecting portion is provided with a connecting protrusion, and the first spring is mounted on the first connecting portion by the connecting protrusion.

6. The telescopic hanger assembly according to claim 5, wherein the vertically arranged mounting groove is covered by a positioning component, and the first connecting portion passes through the positioning component.

7. The telescopic hanger assembly according to claim 6, wherein when the second connecting portion is outside the housing, the hanging component is allowed to rotate relative to the housing.

* * * * *